(12) United States Patent
Carbaugh et al.

(10) Patent No.: US 7,448,855 B2
(45) Date of Patent: Nov. 11, 2008

(54) DROOP STOP MECHANISM FOR HELICOPTER ROTOR BLADE

(75) Inventors: Steven R. Carbaugh, Glen Mills, PA (US); Steven J. Spear, Chalfont, PA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 11/356,498

(22) Filed: Feb. 17, 2006

(65) Prior Publication Data

US 2007/0196210 A1     Aug. 23, 2007

(51) Int. Cl.
*B64C 27/39* (2006.01)
(52) U.S. Cl. ...................................... 416/140; 416/153
(58) Field of Classification Search .................... 416/46, 416/51, 134 A, 140, 141, 142, 153
See application file for complete search history.

(56) References Cited

U.S. PATENT DOCUMENTS

| | | | | |
|---|---|---|---|---|
| 2,471,681 A | * | 5/1949 | Gluhareff | 416/117 |
| 2,614,640 A | * | 10/1952 | Buivid | 416/140 |
| 3,932,059 A | * | 1/1976 | Rybicki | 416/140 |
| 4,549,851 A | * | 10/1985 | Pariani | 416/140 |
| 4,652,210 A | * | 3/1987 | Leman et al. | 416/140 |
| 2007/0086894 A1 | * | 4/2007 | Zinni | 416/134 A |

* cited by examiner

*Primary Examiner*—Edward Look
*Assistant Examiner*—Nathaniel Wiehe
(74) *Attorney, Agent, or Firm*—Don C. Lawrence; MacPherson Kwok Chen & Heid LLP

(57) ABSTRACT

A droop stop mechanism for a helicopter rotor blade includes a pair of opposing stops disposed on opposite sides of the blade's flap hinge. An interposer is mounted at the end of an arm on a rotatable shaft for rotation in a plane perpendicular to the hinge. A torsion spring disposed concentrically about the shaft has a first end that is fixed and a second end coupled to the shaft to bias the interposer to a position disposed between the stops, thereby limiting blade droop. A weight is attached to the shaft such that, with rotation of the rotor, centrifugal forces acting on the weight cause the shaft and arm to rotate so as to overcome the bias of the spring and urge the interposer out from between the stops, thereby allowing greater blade droop. The spring and shaft are sealed in a canister for protection from the elements.

23 Claims, 5 Drawing Sheets

DROOP STOP MECHANISM FOR HELICOPTER ROTOR BLADE

STATEMENT REGARDING FEDERALLY SPONSORED RESEARCH OR DEVELOPMENT

This invention was made with Government support under contract DAAH01-99-3-R001 awarded by the U.S. Army. The Government has certain rights in this invention.

TECHNICAL FIELD

This invention pertains to the field of aviation, in general, and more particularly, to a mechanism that uses a torsional spring and centrifugal force to limit the amount of flap or droop experienced by the main rotor blades of a helicopter.

BACKGROUND

Helicopter rotor systems typically employ stops to limit the amount of vertical deflection experienced by the outer portions of the rotor blades relative to the flap hinge of the blade. These may include stops for limiting both downward, or "drooping," deflection, and upward, or "flapping" deflection. Stops for limiting downward deflections are called "droop stops," and stops for limiting upward deflection are called "flap stops." Droop stops are required to prevent the rotor blade from contacting other objects, such as the ground, bystanders or other parts of the helicopter. Flap stops are required to prevent the rotor blade from "sailing" up uncontrollably, and thereby damaging rotor components.

Of importance, the amount of flapping or drooping that the blade is permitted to experience depends on whether the blade is rotating. Occasionally, larger flapping motions are required when the blade is rotating than when it is not. This is because, when the blade is rotating, it is exposed to a relatively large centrifugal force that acts on it radially, i.e., along it long axis. This force increases the stiffness of the blade, and additional flapping of the blade is then acceptable, and indeed, may be necessary, for proper blade operation. However, when the blade is not rotating, and the additional stiffening imparted to it by centrifugal force therefore absent, the blade tends both to sag more, due to the effect of gravity, and to sail more, e.g., as a result of wind gusts acting on it. Therefore, to prevent rotor damage, the flapping and drooping limits are more restrictive when the blade is either not rotating or rotating slowly.

It is known in the prior art to control the amount of flapping or drooping motions of the blade by the use of "stop mechanisms" that are actuated by centrifugal force (herein, "CF"). Thus, when the rotor is not turning, the mechanisms operate automatically to insert a stop, called an "interposer," between portions of the blade and the rotor hub that restricts flapping or drooping of the blade about its flap hinge to a greater extent than when the rotor is turning. However, in addition to simply inserting an interposer to limit flap or droop for the rotor blade, it is important that the mechanism also be arranged such that the "re-insertion point," i.e., the rpm, or rotational speed of the rotor, at which the interposer engages, be carefully "tuned" for the mechanism to function properly. Thus, if the re-insertion does not occur at the correct rpm, component damage and/or aircraft performance problems can result.

Additionally, any rotorcraft utilizing a blade-folding mechanism, e.g., for compact storage of the rotorcraft in a hangar or aboard a aircraft carrier, almost always requires a CF flap stop mechanism simply to enable the folding operation to be effected properly. Folding operations are highly susceptible to interference caused by wind gusts, and typically require that all flapping motion to be locked-out during the folding sequence. CF stop mechanisms are thus ideal for this application.

In the case of the dual-rotor CH-47 "Chinook" helicopter, the aft rotor system is tilted forward over the fuselage, thus making a blade-aircraft strike inevitable during rotor shutdown without tighter blade droop control. This tighter droop control requirement can be achieved using a prior art CF-actuated droop stop mechanism, and the CH-47 Chinook Helicopter is currently equipped with such a mechanism. The prior art CF droop stop mechanism utilizes an exposed linear-compression-spring-and-weight system. When the rotor begins to spin, a centrifugal force is applied to the weight of the mechanism, thereby causing it to be accelerated radially outward. This weight is connected by an arm to an interposer that limits droop of the rotor blade. Thus, when the weight moves radially outward, the interposer is moved out of the way, thereby exposing a stop surface that allows more droop of the blade to occur.

However, the prior art mechanism has a number of disadvantages associated with it, including its relatively large size and weight, complexity of installation and configuration for correct operation, and its susceptibility to damage due to the exposure of its components to the elements, e.g., icing conditions, thereby risking mechanical failure and damage to the aircraft caused by mechanical interference between the components of the mechanism.

Further, although the CH-47 Chinook helicopter currently utilizes only a conventional CF droop stop mechanism, it could, along with many other helicopter designs, benefit advantageously from the use of a CF flap stop mechanism. An appropriately designed CF flap stop mechanism could limit most flapping (i.e., upward motion) of the blades when the rotor is not turning, thus reducing the risk of aircraft damage due to wind gusts. However, the relative size and complexity of the prior art design now being used prohibits its use as a flap stop on the CH-47 Chinook and other helicopters.

Accordingly, there is a long felt but as yet unsatisfied need in the rotorcraft field for a CF-actuated helicopter blade flap- or droop-stop mechanism that is substantially smaller in size, lighter in weight, easier to install and configure for reliable operation, and whose susceptibility to damage and malfunction due to exposure to the elements is substantially less than that of current designs.

BRIEF SUMMARY

In accordance with the exemplary embodiments thereof described herein, the present invention provides a CF-actuated helicopter blade droop- or flap-stop mechanism that is smaller in size, lighter in weight, easier to install and configure for reliable operation, and whose susceptibility to damage and malfunction due to exposure to the elements is substantially less than the droop stop mechanisms of the prior art.

In one advantageous droop stop embodiment, the mechanism comprises a pair of stops disposed in opposition to each other on opposite and lower sides of a flap hinge of the blade, e.g., on a hub of the rotor and a pitch shaft of the blade. An interposer is mounted on the hub for rotational movement in a plane perpendicular to the flap hinge by means of an assembly comprising an elongated shaft, a segmented arm, and a spring support to which the interposer is attached.

The shaft is rotatably mounted to the hub of the rotor with its long axis disposed perpendicular to plane of rotation of the interposer. The arm has a first end attached at a right angle to an end of the shaft for conjoint rotation therewith, and an opposite, second end. The interposer is attached to the second end of the arm by the spring support, which has a U-shaped cross section configured to resist tangential movement of the interposer relative to the stops, but to allow some radial movement of the interposer relative thereto. The angular position of the spring support relative to the arm is also adjustable to permit fine adjustment of the interposer's position when it is disposed between the two stops.

A torsion spring is disposed concentrically about the shaft, and has a first end that is fixed, and an opposite second end coupled to the shaft so as to bias the shaft, arm, spring support, and hence, the interposer, to a first angular position disposed between the two stops such that downward rotational deflection of the blade about the flap hinge, or droop, is substantially limited. A weight is disposed on the arm and shaft at the end of an elongated spacer such that, with rotation of the rotor, centrifugal force acting on the spinning weight causes the shaft and arm to rotate conjointly, and at the appropriate rotational speed, to overcome the bias of the torsion spring and urge the interposer out from between the stops and to a second angular position that allows a greater droop of the blade.

Advantageously, the torsional bias exerted by the spring on the interposer through the shaft, arm and spring support assembly is adjustable such that the interposer can be programmed to move from the first, droop stopping position to the second, droop allowing position, and vice versa, at a selected rotational speed of the rotor.

In one exemplary embodiment, the interposer comprises a simple rectangular plate having a pair of opposite lateral faces, each of which is disposed in parallel opposition to a corresponding one of the stops when the interposer is disposed in the first, droop stopping position. The shape of each of the lateral faces comprises a segment of a cylindrical surface that prevents the interposer from being squeezed out from between the stops.

In a preferred exemplary embodiment, the torsion spring and all but a first end portion of the shaft are enclosed in a sealed housing, or canister, to reduce their susceptibility to damage and malfunction due to exposure to the elements, such as icing conditions. The shaft is rotatably journalled in sealed bushings for rotation within the canister. The canister is fixed to the hub, and the initial angular position of the shaft relative to the canister is adjustable such that the shaft applies a selected amount of torsional bias, or torque, to the interposer through the shaft. The canister prevents ice from forming on the spring and shaft and adversely affecting the operation of the mechanism.

A better understanding of the above and many other features and advantages of the droop-and-flap stop mechanism of the present invention and the methods of its use may be obtained from a consideration of the detailed description of the exemplary embodiments thereof below, particularly if such consideration is made in conjunction with the appended drawings, wherein like reference numerals are used to identify like elements illustrated in one or more of the figures therein.

DETAILED DESCRIPTION

Figure 1:
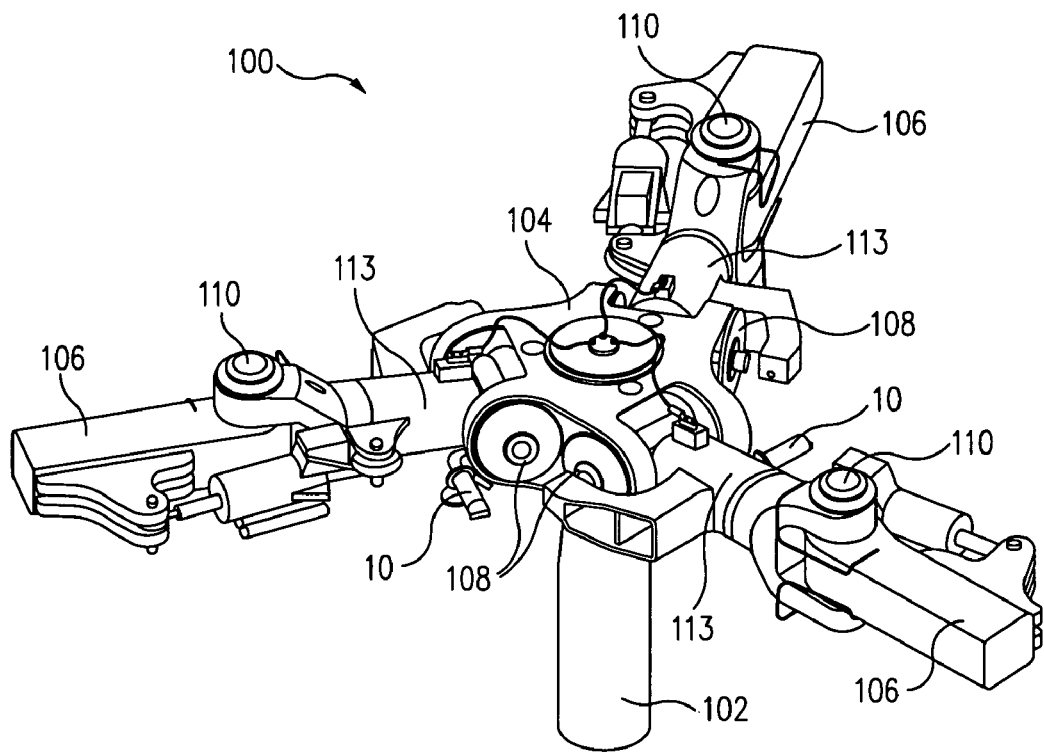
FIG. 1 is a partial top and side perspective view of a main rotor of a helicopter incorporating an exemplary embodiment of a blade droop stop mechanism in accordance with the present invention.

FIG. 1 is a partial top and side perspective view of a main rotor 100 of a helicopter incorporating a rotor shaft 102, a hub 104 disposed at the end of the shaft, and three blades 106 radiating outward from it, each of which is equipped with an exemplary embodiment of a CF-actuated droop stop mechanism 10 in accordance with the present invention. As illustrated in FIG. 1, each of the rotor blades is pinioned to the hub by a pair of hinges, viz., a "flap hinge" 108 and a "lag hinge" 110 that respectively enable the associated blade to pivot up and down, and fore and aft, relative to the hub. Additionally, the blade and lag hinge are rotatably coupled to the flap hinge by a pitch shaft 112 (see FIG. 6) rotatably contained within a pitch shaft housing 113 for conjoint rotation with the blade about the long axes thereof.

Figure 5:
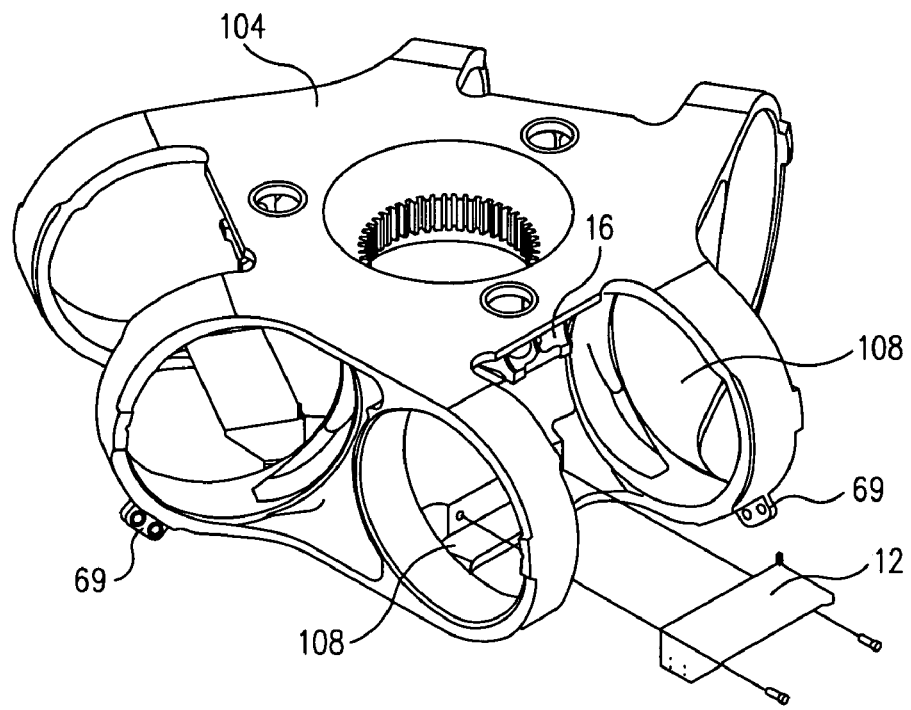
FIG. 5 is top and side perspective view of a hub of the main rotor of FIG. 1, showing one of a pair of opposing stops of the mechanism spaced apart from its mounting position on the hub.
Figure 6:
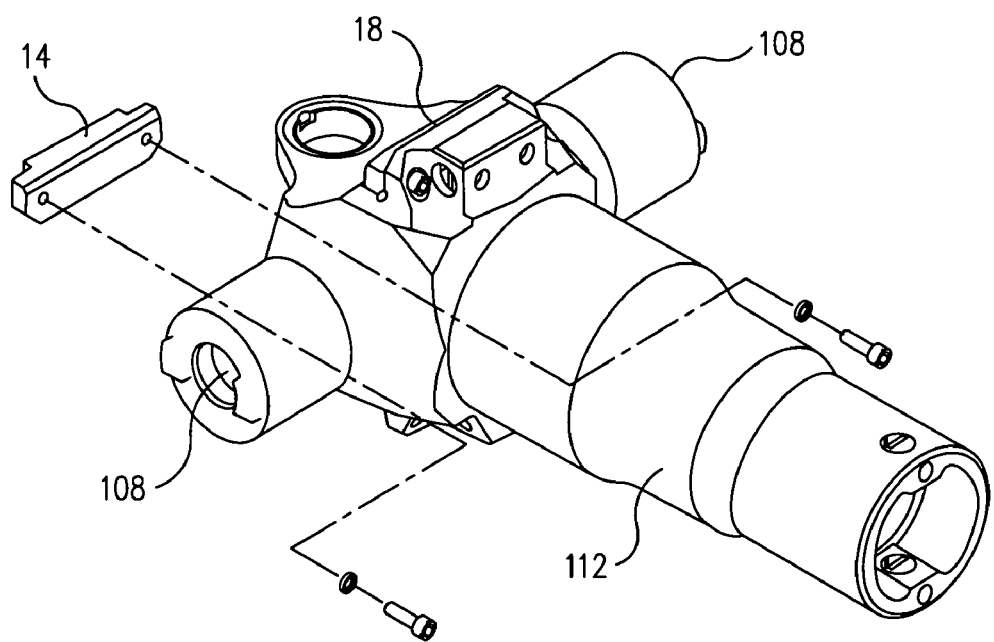
FIG. 6 is a top and side perspective view of a pitch shaft of an associated rotor blade, showing an opposing one of the pair of stops of the mechanism spaced apart from its mounting position on the shaft.

As respectively illustrated in the enlarged perspective views of the hub 104 and the pitch shaft 112 of FIGS. 5 and 6, the exemplary droop stop mechanism 10 comprises a pair of droop stops 12 and 14 disposed in spaced opposition to each other on opposite sides of and below the flap hinge 108 of the associated blade 106, e.g., on respective opposing lower faces of the hub and the pitch shaft. It will be understood that, as the blade (not illustrated) mounted at the outer end of the pitch shaft rotates downward about the flap hinge, or "droops," the two droop stops will approach and eventually contact one another, thereby preventing further drooping of the blade, and further, that by interposing a spacer, or "interposer," between the two stops that maintains their original spacing from one another, any substantial drooping of the blade about the flap hinge is prevented.

It may be further appreciated that a similar arrangement can be effected for preventing or substantially limiting "flapping," i.e., upward rotation, of the blade 106 about the flap hinge 108 by the provision of a pair of analogous flap stops 16 and 18 disposed in spaced opposition to each other on opposite sides of and above the flap hinge 108 of the associated blade 106, e.g., on respective opposing upper faces of the hub 104 and the pitch shaft 112.

Figure 2:
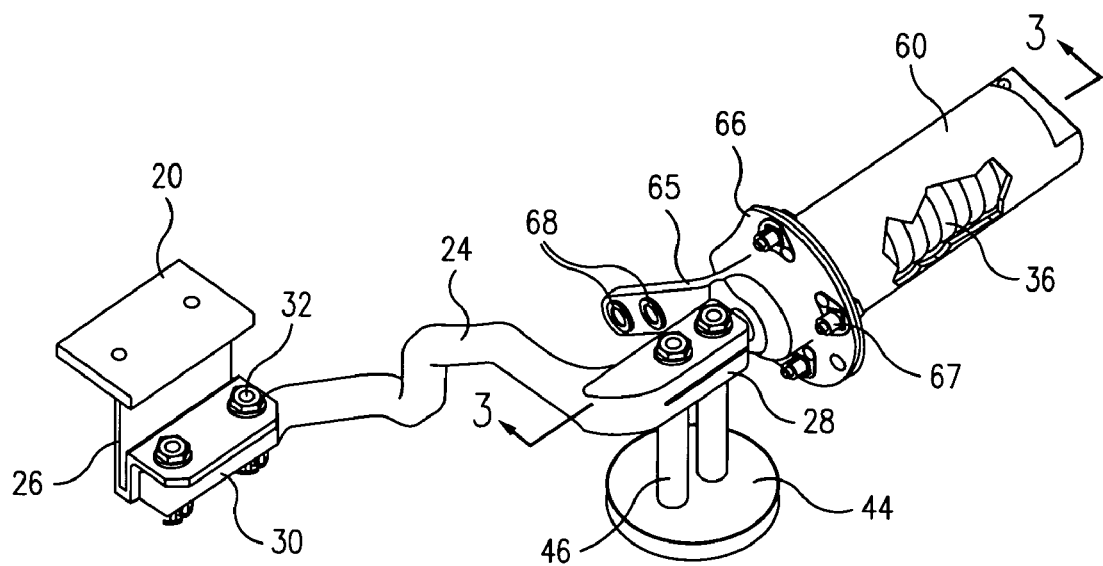
FIG. 2 is a top and side perspective view of the droop stop mechanism of FIG. 1.
Figure 3:
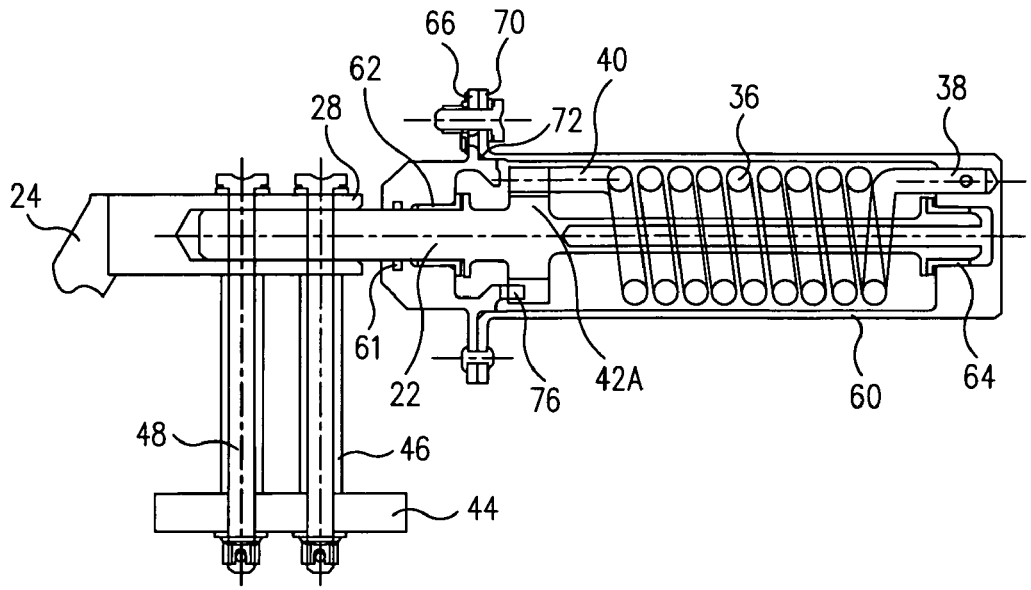
FIG. 3 is a partial cross-sectional side elevation view of the exemplary mechanism, as seen along the section lines 3-3 taken in FIG. 2.
Figure 4:
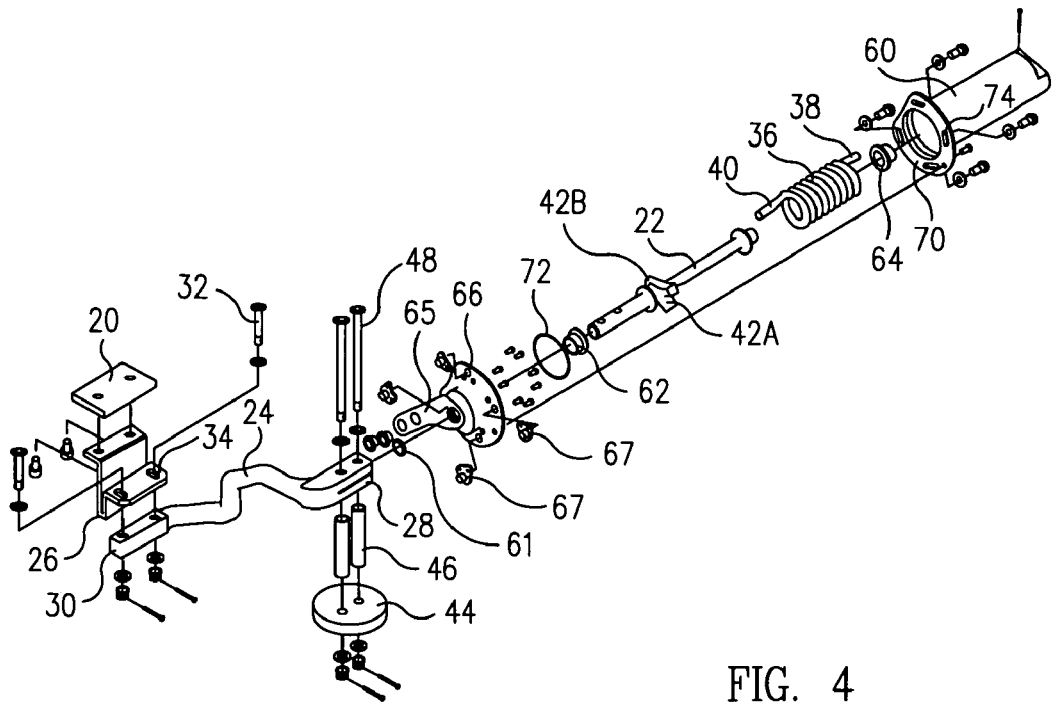
FIG. 4 is an exploded perspective view of the mechanism.

In light of the foregoing considerations, and with reference to FIGS. 2-4, the exemplary droop stop mechanism 10 further comprises an interposer 20 mounted on the hub 104 of the rotor 100 for rotational movement in a plane perpendicular to the corresponding flap hinge 108 by means of an assembly comprising an elongated shaft 22, a segmented arm 24, and a spring support 26 to which the interposer is attached, for rotation between a first angular position disposed between the two droop stops 12 and 14, and a second angular position disposed below and out from between the two stops.

The shaft 22 is rotatably mounted to the hub 104 of the rotor 100 by means of a sealed, protective canister 60 described in more detail below, with its long axis disposed tangential to a direction of rotation of the hub, and hence, perpendicular to the plane of rotation of the interposer 20. The arm 24 has a first end 28 attached at a right angle to an end of the shaft for conjoint rotation therewith, and an opposite, second end 30 disposed in the plane of rotation of the interposer.

Figure 8:
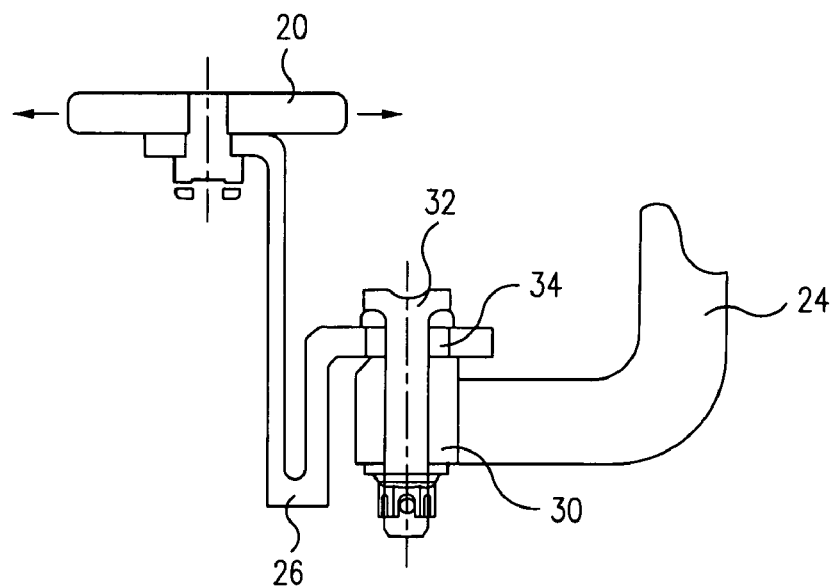
FIG. 8 is an enlarged partial cross-sectional elevation view of the interposer of FIG. 7, showing the interposer mounted to an end of a rotating arm of the mechanism by a spring support of the mechanism.

As illustrated in the partial side elevation view of FIG. 8, the interposer 20 is coupled to the second end 30 of the arm 24 by the spring support 26, which is configured with a U-shaped cross-section to resist tangential movement of the interposer relative to the two stops 14 and 16, but to permit some radial movement, or "give," of the interposer between them, as indicated by the arrows in FIG. 8, to compensate for any slight misalignment between the interposer and the stops. Additionally, the angular and radial positions of the spring support relative to the second end of the arm is made adjustable by the provision of a pair of bolts 32 (see FIG. 4) extending through corresponding adjustment slots 34 in the support and into the arm to permit fine positioning of interposer between the stops.

As illustrated in FIGS. 3 and 4, a torsion spring 36 is disposed concentrically about the shaft 22, and has a first end 38 that is fixed to the canister 60 internally thereof (see FIG. 3), and an opposite second end 40 coupled to the shaft through a first, bifurcated tang 42A on the shaft so as to bias the shaft, arm 24, spring support 26, and hence, the interposer 20, to a first angular position disposed between the two stops 12 and 14 (see FIG. 7), such that movement of the stops toward each other, and hence, downward rotational deflection of the blade about the flap hinge, or droop, is substantially prevented. A weight 44 is disposed at the end of an elongated spacer 46 and mounted to the arm and shaft at a right angle to the shaft. In the particular exemplary embodiment illustrated, the spacer comprises a pair of elongated tubes disposed in a spaced, parallel relationship to each other, with a pair of corresponding bolts 48 respectively extending through the spacers and holding the weight on the arm and shaft, but as will be appreciated, other weight mounting arrangements are possible.

Figure 7:
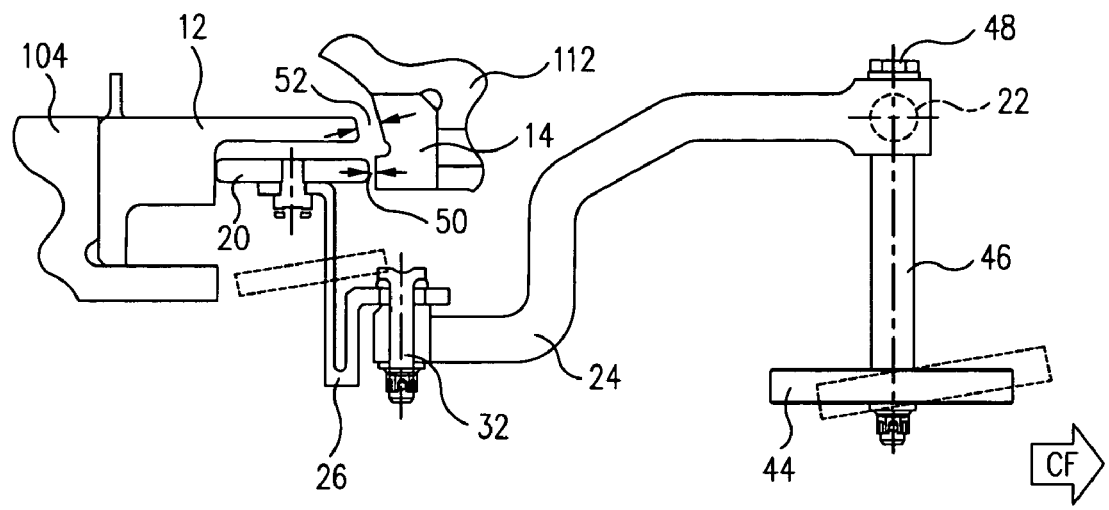
FIG. 7 is a partial cross sectional elevation view of the mechanism, showing, in solid outline, an interposer and a weight of the mechanism disposed in respective first positions for limiting droop of an associated blade of the rotor, and in dashed outlines, respective second positions thereof for allowing a greater droop of the blade.

As illustrated in the partial side elevation view of FIG. 7, as the rotor 100 begins to rotate with increasing speed, a centrifugal force acts on the spinning weight 44 in the direction indicated by the large arrow. The force on the weight causes the shaft 22 and arm 24 to rotate radially outward so as to overcome the bias of the torsion spring 36 on the shaft and to urge the interposer 20 out from the first position, i.e., disposed between the stops 12 and 14 (as indicated by the solid outline in FIG. 7), and to rotate it to a second angular position disposed below the stops (as indicated by the dashed outline of FIG. 7), thereby allowing a greater droop of the associated blade. In the particular exemplary embodiment illustrated in FIG. 7, when the interposer is disposed between the stops, i.e., in the droop-limiting position, the size of the space between the interposer and the stop 14 (indicated by the arrows 50) is such that the droop of the blade is limited to 1.5 degrees. When the interposer is disengaged, i.e., disposed in the droop-allowing position illustrated by the dashed outline, the size of the space between the two stops indicated by the arrows 52 is such that the droop of the blade is limited to 5.75 degrees. As will be appreciated, these dimensions are easily modified to accommodate other blade droop stop requirements.

Advantageously, the torsional bias exerted by the spring 36 on the interposer 20 through the shaft 22, arm 24 and spring support 26 assembly is adjustable in the manner described below such that the mechanism 10 can be "programmed," i.e., selectably biased, to move the interposer from the first, droop-stopping position to the second, droop-allowing position, and vice-versa, at a selected rotational speed, or rpm, of the rotor 100. In the particular exemplary embodiment illustrated, the initial torsional force exerted by the spring on the shaft is set such that the centrifugal force acting on the weight 44 is not sufficient to overcome torsional bias of the spring until the rotor reaches approximately 66% of its full, operational rotational speed. Additionally, the spring is sized and configured such that the centrifugal force rotates the interposer through its full rotational displacement (≈10 degrees of rotation), i.e., to the second position, at a rotor rotational speed of approximately 89% its full operational speed. Alternatively, however, the particular speed of the rotor at which the interposer is engaged or disengaged can also be selectably adjusted by adjusting at least one of the length of moment arm defined by the spacer 46, and the size, i.e., the mass, of the weight.

Figure 9:
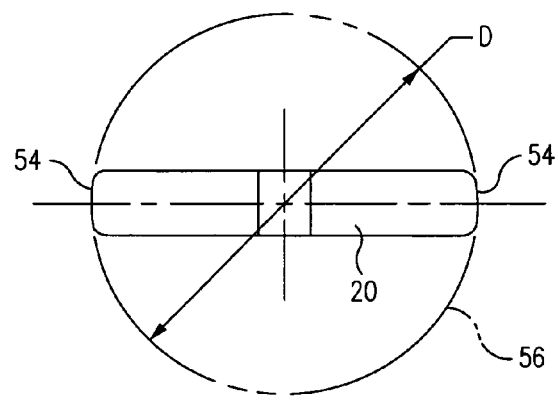
FIG. 9 is an enlarged end elevation view of the interposer of FIG. 8, showing the shape of opposite lateral faces of the interposer conforming to a segment of a cylindrical surface having a diameter D; and, FIG. 10 is a graph showing the improvement in performance of the mechanism during icing conditions, as compared to the performance of a prior art mechanism under identical conditions.

As illustrated in the end elevation view thereof of FIG. 9, in one exemplary preferred embodiment, the interposer 20 comprises a simple rectangular plate having a pair of opposite lateral faces 54, each of which is disposed in parallel opposition to a corresponding one of the stops 12 and 14 when the interposer is disposed in the first, droop-stopping position. The lateral faces are each shaped to conform to a segment of a cylindrical surface 56 having a diameter D, so that compressive forces exerted on the interposer by the opposing stops are carried through the center of the interposer to prevent the forces from squeezing the interposer out from between the stops.

Of importance, in a preferred exemplary embodiment of the droop stop mechanism 10, the torsion spring 36 and all but a first end portion of the shaft 22 are enclosed in a sealed housing, or canister 60, to reduce their susceptibility to damage and malfunction due to their exposure to the elements, and in particular, icing conditions. As illustrated in FIG. 3, the shaft is rotatably journalled behind an O-ring rotary seal 61 in bushings 62 and 64 in the opposite ends of the canister for rotation therein, with the first end 38 of the torsion spring being fixed to the canister internally, as described above. As illustrated in FIGS. 2-4, the canister mounts to the hub 104 of the rotor 100 by means of a mounting arm 65 with a flange 66 that forms an end closure of the canister. The arm 65 incorporates a pair of bushings 68 (see FIG. 2) for connecting the mechanism to mating holes in a corresponding mounting flange 69 on the hub (see FIG. 5).

The flange 66 of the mounting arm 65 mates with a corresponding flange 70 on the end of the canister 60 with an O-ring 72 compressed therebetween to form an environmental seal against the elements (see FIG. 2). The flange of the mounting arm includes a plurality of nut-plates 67 for bolting the respective flanges to each other. Circumferential slots 74 are formed in the flange of the canister to enable the canister, and hence, the fixed end 38 of the torsion spring 36, to be rotated circumferentially relative to the shaft 22 and the mounting arm, thereby enabling the amount of torsional bias applied by the spring to the shaft, and hence, to the interposer 20, to be selectably adjusted.

The flange 66 of the mounting arm 65 also includes an axial tab 76 (see FIG. 3) that is disposed to engage a second tang 42B on the shaft 22, and thereby limit the amount of angular displacement through which the shaft, and hence, the interposer can rotate, e.g., 10 degrees.

Figure 10:
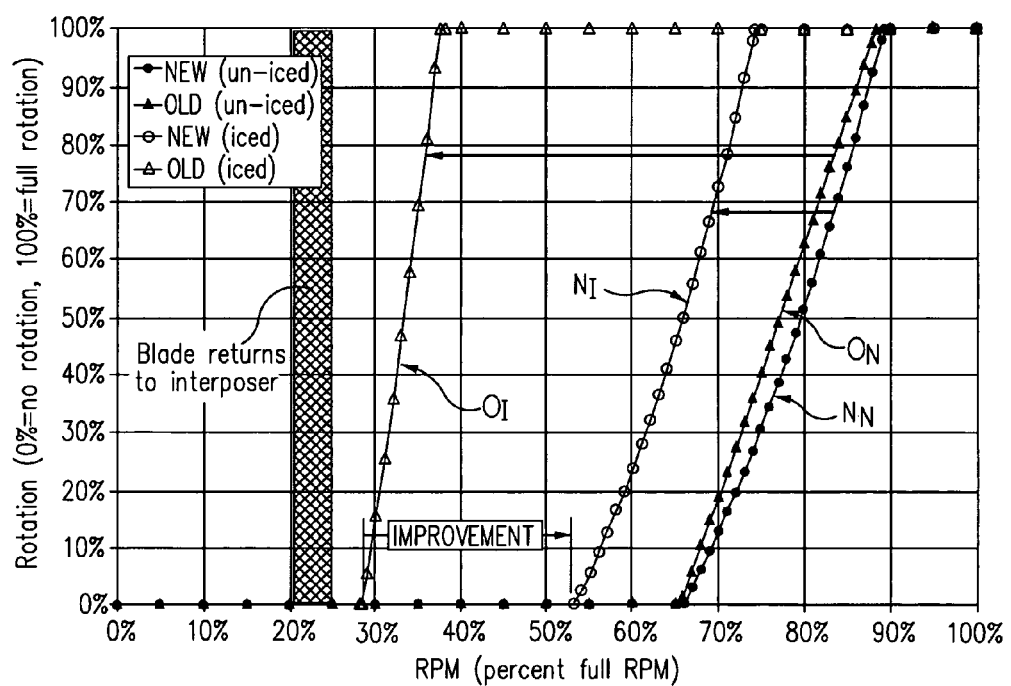

One of the many benefits achieved by enclosing the torsion spring 36 and shaft 22 of the exemplary droop stop mechanism 10 in the sealed canister 60, and by making it substantially more compact than prior art designs, is graphically illustrated in the graph of FIG. 10. In the graph, the angular position of an interposer, expressed as a percentage of its full range of rotation (where 0% corresponds to the first angular position disposed between the stops 12 and 14, and 100% represents the second angular position fully retracted from the stops) is plotted as a function of the rotational speed the rotor 100, expressed as a percentage of its full operational speed (i.e., where 0% corresponds to a still rotor, and 100% corresponds to one rotating at full operational speed). Four curves are plotted on the graph for comparison, respectively corresponding to the performance of a droop stop mechanism of the prior art ("OLD") under normal conditions (curve "$O_N$") and under moderate icing conditions (curve "$O_I$"), and the performance of a droop stop mechanism 10 in accordance with the present invention ("NEW") under the same two conditions (curves "$N_N$" and "$N_I$").

As may be seen from a comparison of the graphs of the respective performances of the two mechanisms under normal conditions, i.e., curves $O_N$ and $N_N$, the performance of the two mechanisms is substantially similar, i.e., they both begin to retract (or effect full reinsertion) of the interposer at about 66% of the rotor's full operational speed, and both are fully retracted (or begin reinsertion) at about 89% of the rotor's full speed.

However, as may be seen from a comparison of the performance curves of the two mechanisms under moderate icing, i.e., curves $O_I$ and $N_I$, their performance is markedly different. This is because ice accumulating on the mechanisms increases the weight of the spring counterbalance (thus reducing the re-insertion rpm), and in the case of the prior art mechanism, which uses an exposed linear compression spring, interferes with the operation of the spring. The effect of icing is thus to shift the respective performance curves for the two mechanisms toward the left side of the graph.

As may be seen from a comparison of curves $O_I$ and $N_I$, the mechanism 10 of the present invention performs substantially better than the prior art mechanism under icing conditions. The conventional mechanism is larger, and hence, accumulates substantially more ice than does the mechanism of the present invention under the same conditions. Thus, the point at which the centrifugal force overcomes the bias of the spring in the prior art mechanism drops to about 29% of full rotor rpm, due to the weight of the ice, whereas, in the mechanism 10 of the present invention, it drops to only about 53% of full rotor rpm. Additionally, the prior art mechanism is fully retracted (or begins reinsertion) at only 38% of full rotor rpm, whereas, the new mechanism 10 is fully retracted (or begins reinsertion) at 74% of full rotor rpm.

These results are due to the fact that the exemplary mechanism 10 has substantially less surface area on which ice can accumulate, and because the torsion spring 36 and the shaft 22 are protected against interference caused by ice by the sealed canister 60. As a point of reference, the blades of the rotor blade in normal conditions will begin to droop at between about 20-24% of full rotor rpm. Consequently, when the existing mechanism is iced, the helicopter is at risk of having a blade strike the fuselage. The mechanism 10 of the present invention thus presents a substantial gain in safety and reliability of operation over the prior art mechanism.

By now, those of skill in this art will appreciate that many modifications, substitutions and variations can be made in and to the materials, apparatus, configurations and methods of the CF-actuated droop stop mechanism of the present invention without departing from its spirit and scope. For example, it will be noted that the mounting arrangement of the mechanism can easily be modified such that mechanism rotates the interposer between an opposing pair of flap stops 16 and 18, as described above, and thus function as an efficient CF-actuated flap stop mechanism. Indeed, because of the smaller size, lighter weight and easy adjustability of the mechanism, they can be deployed in associated pairs to effect both droop- and flap-stop functions.

In light of the above, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A droop stop mechanism for a main rotor blade of a helicopter, comprising:
    a pair of opposing stops respectively disposed on a hub of the rotor and a pitch shaft of the blade;
    an elongated shaft rotatably mounted to the hub of the rotor and having a long axis disposed tangential to a direction of rotation thereof;
    a torsion spring disposed concentrically about the shaft and having a fixed first end and an opposite second end coupled to the shaft for torsional biasing of the shaft by the spring;
    an arm having a first end attached at a right angle to a first end of the shaft for conjoint rotation therewith and an opposite second end;
    an interposer mounted on the second end of the shaft for rotation in a plane perpendicular to a flap hinge of the blade;
    the torsion spring biasing the interposer to a first angular position disposed between the two stops such that downward deflection of the blade about the flap hinge is substantially limited,
    a spacer having opposite first and second ends, the first end being attached at a right angle to the shaft and the arm; and,
    a weight disposed at the second end of the spacer such that a radially outward centrifugal force acting thereon with rotation of the rotor causes the shaft and arm to rotate conjointly so as to overcome the bias of the torsion spring on the shaft and urge the interposer from the first angular position to a second angular position at which a greater downward deflection of the blade about the flap hinge is allowed.

2. The droop stop of mechanism of claim 1, wherein the bias exerted by the torsion spring on the shaft is adjustable such that the interposer moves from the first angular position to the second angular position at a selected rotational speed of the rotor 3. The droop stop mechanism of claim 1, wherein the spring and all but a first end pardon of the shaft are enclosed in a sealed canister.

4. The droop stop mechanism of claim 3, wherein the canister is fixed to the hub and the shaft is journalled in sealed bushings for rotation within the canister.

5. The droop stop mechanism of claim 1, further comprising a spring support disposed between the interposer and the second end of the arm, the spring support having a U-shaped cross section and being configured to resist tangential movement of the interposer relative to the hub, but to allow some radial movement of the interposer relative thereto.

6. The droop stop mechanism of claim 5, wherein at least one of an angular and a radial position of the spring support relative to the second end arm is adjustable.

7. The droop stop mechanism of claim 1, wherein:
    the interposer comprises a rectangular plate having a pair of opposite lateral faces, each of which is disposed in parallel opposition to a corresponding stop when the interposer is disposed in the first angular position, and
    the shape of each of the lateral faces comprises a segment of a cylindrical surface.

8. A helicopter having a main rotor and a plurality of blades, each equipped with the droop stop mechanism of claim 1.

9. A method for limiting droop of a main rotor blade of a helicopter, the method comprising:
    providing a droop stop mechanism in accordance with claim 1;
    installing the mechanism between the blade and the hub of the rotor; and, adjusting the bias of the torsion spring on the interposer such that the interposer moves from the first angular position to the second angular position at a selected rotational speed of the rotor.

10. A method for limiting droop of a main rotor blade of a helicopter, the method comprising:
   disposing a pair of stops in opposition to each other on opposite sides of a flap hinge of the blade;
   providing an elongated shaft;
   coupling an arm at a right angle to an end of the shaft;
   mounting the shaft on the hub of the blade such that the long axis of the shaft is disposed tangential to the direction of rotation of the hub and an end of the arm is disposed for rotational movement in a plane perpendicular to the flag hinge;
   coupling an interposer to the second end of the arm for rotational movement in the perpendicular plane;
   biasing the shaft with a torsion spring such that the interposer is disposed in a first angular position between the two stops and thereby limits downward deflection of the blade about the flap hinge; and,
   weighting the arm and shaft such that, with rotation of the rotor, a centrifugal force acting on the arm and shaft overcomes the bias of the torsion spring and rotates the interposer to a second angular position that allows a greater downward deflection of the blade about the flap hinge.

11. The method of claim 10, further comprising adjusting the bias of the torsion spring on the interposer such that the interposer moves from the first angular position to the second angular position at a selected rotational speed of the rotor.

12. The method of claim 10, wherein weighting the interposer comprises:
   providing an elongated spacer having a first end attached at a right angle to the shaft; and, attaching a weight to an opposite second end of the spacer.

13. The method of claim 12, further comprising adjusting at least one of the length of the spacer, the size of the weight, and the bias of the torsion spring on the shaft such that the interposer moves from the first angular position to the second angular position at a selected rotational speed of the rotor.

14. The method of claim 10, further comprising:
   providing a sealed canister;
   fixing the canister to the hub of the rotor;
   enclosing the torsion spring and all but a first end portion of the shaft in the canister;
   journalling the shaft in sealed bushings for rotation within the canister;
   fixing a first end of the spring to the canister; and,
   coupling a second end of the spring to the shaft for torsional biasing thereof by the spring.

15. A helicopter, comprising:
   an engine rotatably driving a rotor shaft;
   a main rotor coupled to the shaft, the rotor having a hub with a plurality of blades rotatably coupled thereto by respective flap hinges; and,
   a droop stop mechanism associated with each of the blades for limiting droop of the blade, the mechanism comprising:
      a pair of stops disposed in opposition to each other on opposite sides of the flap hinge of the blade;
      an interposer mounted on the hub of the rotor for rotational movement in a plane perpendicular to the flap hinge;
      an elongated shaft rotatably mounted to the rotor and having a long axis disposed tangential to a direction of rotation thereof;
      an arm having opposite first and second ends, the first end being attached at a right angle to a first end of the shaft for conjoint rotation therewith, and the second end being coupled to the interposer;
      a torsion spring disposed concentrically about the shaft, the spring having a fixed first end and an opposite second end coupled to the shaft so as to bias the interposer to a first angular position disposed between the two stops such that downward deflection of the blade about the flap hinge is limited;
      a spacer having opposite first and second ends, the first end being attached at a right angle to the shaft and the arm; and,
      a weight disposed at the second end of the spacer such that, with rotation of the rotor, centrifugal forces acting on the weight cause the shaft and arm to rotate conjointly in such a way as to overcome the bias of the torsion spring and urge the interposer out from between the stops and to a second angular position that allows a greater downward deflection of the blade about the flap hinge.

16. The helicopter of claim 15, wherein the bias exerted by the torsion spring on the shaft is adjustable such that the interposer moves from the first angular position to the second angular position at a selected rotational speed of the rotor.

17. The helicopter of claim 15, wherein the torsion spring and all but a first end portion of the shaft are enclosed in a sealed canister.

18. The helicopter of claim 17, wherein the canister is fixed to the hub and the shaft is journal led in sealed bushings for rotation within the canister.

19. The helicopter of claim 17, wherein the first end of the spring is fixed to the canister.

20. The helicopter of claim 15, wherein the interposer is coupled to the second end of the arm by a spring support having a U-shaped cross-section configured to resist tangential movement of the interposer relative to the hub, but to allow some radial movement of the interposer relative thereto.

21. The helicopter of claim 20, wherein at least one of an angular and a radial position of the spring support relative to the second end of the arm is adjustable.

22. The helicopter of claim 15, wherein:
   the interposer comprises a rectangular plate having a pair of opposite lateral faces, each of which is disposed in parallel opposition to a corresponding stop when the interposer is disposed in the first angular position, and
   the shape of each of the lateral faces comprises a segment of a cylindrical surface.

23. The helicopter of claim 15, wherein the spacer comprises a pair of elongated tubes disposed in a spaced, parallel relationship to each other.

* * * * *